(No Model.) 7 Sheets—Sheet 2.

L. J. HIRT.
ELECTRIC SNOW PLOW.

No. 523,471. Patented July 24, 1894.

WITNESSES.
Matthew M. Blunt.
J. Murphy.

INVENTOR.
Louis J. Hirt
By Jas. F. Churchill
Atty.

(No Model.) 7 Sheets—Sheet 3.
L. J. HIRT.
ELECTRIC SNOW PLOW.

No. 523,471. Patented July 24, 1894.

WITNESSES.
Matthew M. Blunt
J. Murphy

INVENTOR.
Louis J. Hirt
By Jas. H. Churchill
Atty.

(No Model.) 7 Sheets—Sheet 5.

L. J. HIRT.
ELECTRIC SNOW PLOW.

No. 523,471. Patented July 24, 1894.

WITNESSES.
Matthew M. Blunt.
J. Murphy.

INVENTOR.
Louis J. Hirt
By Jas. H. Churchill
Atty.

(No Model.) 7 Sheets—Sheet 6.
L. J. HIRT.
ELECTRIC SNOW PLOW.

No. 523,471. Patented July 24, 1894.

WITNESSES.
Matthew M. Blunt.
J. Murphy.

INVENTOR.
Louis J. Hirt
By Jas. H. Churchill
Atty.

UNITED STATES PATENT OFFICE.

LOUIS J. HIRT, OF SOMERVILLE, MASSACHUSETTS.

ELECTRIC SNOW-PLOW.

SPECIFICATION forming part of Letters Patent No. 523,471, dated July 24, 1894.

Application filed November 20, 1893. Serial No. 491,439. (No model.)

*To all whom it may concern:*

Be it known that I, LOUIS J. HIRT, residing in Somerville, in the county of Middlesex and State of Massachusetts, have invented an Improvement in Electric Snow-Plows, of which the following description, in connection with the accompanying drawings, is a specification, like letters and figures on the drawings representing like parts.

This invention relates to a snow plow for electric railways, and more especially for electric street railways, and has for its object to provide a strong, compact and efficient snow plow capable of performing the work required, and constructed so that the operative parts of the plow are readily accessible and may be quickly and easily handled.

In accordance with this invention, the truck frame is made of metal, preferably channel iron or steel, and is provided with side bars, to which and to the top of the truck frame, is bolted or otherwise firmly secured a flooring, upon which is erected a house or cab having special features of construction, as will be described, and within which is located the motor or motors employed to drive the plow. The house or cab is supported upon the main portion of the truck leaving front and rear platforms at the opposite ends of the truck and leaving also side platforms, which are supported by the side bars of the truck frame and by which the operators may readily pass entirely around the cab or house on the outside thereof, and which permits the scrapers or shears to be more quickly and readily handled with a minimum number of men. The truck may be further provided with a novel construction of brake beam, whereby a substantially large shear may be extended across and beneath the truck without interfering with the working parts of the same.

Another feature of this invention consists in a novel mechanism by which the shears may be raised and lowered as will be described.

The invention further consists in a novel device or "digger" designed and adapted to engage the rail of the track to clean the same, the said device being constructed to yield to an excessive resistance as will be described.

The cab or house is provided with a door constructed to open in a substantially small space, and with one or more auxiliary doors in its sides by which access may be had to the motor for repairs or other purpose.

These and other features of this invention will be pointed out in the claims at the end of this specification.

Fig. 3, a top or plan of the truck frame shown in Fig. 2.

The truck frame may and preferably will be made of metal, and consists, as herein shown, (see Fig. 3) of sides A A' and ends $A^2$ $A^3$, the said sides being each composed of preferably two channel iron or steel bars 2, 3, riveted or otherwise firmly secured together. The ends $A^2$ $A^3$ are preferably each composed of a single channel iron, which, for the best results, may be outwardly curved and firmly secured to the sides A A' of the truck frame, the said ends, in the present instance, being shown in Figs. 2 and 3, as secured to the said sides by top and bottom gusset plates $a$ $a'$ to which the said sides and ends are riveted.

The sides A A' of the truck frame are also connected together by intermediate cross bars $a^2$ $a^3$ $a^4$ $a^5$, preferably of channel iron or steel and preferably arranged in pairs, the cross bars $a^2$ $a^3$ being for the best results joined together by longitudinal braces $a^6$ $a^7$, and the cross bars $a^4$ $a^5$ being joined by longitudinal braces $a^8$ $a^9$, the said cross bars and longitudinal braces being preferably secured together by gusset plates $a^{10}$ to which they are fastened, as by rivets $a^{12}$. The sides A A' have secured to them suitable housings $a^{14}$ for the car axles $a^{15}$ $a^{16}$ provided with the wheels $a^{17}$.

The truck frame is provided with additional or auxiliary side bars $a^{18}$ $a^{19}$ preferably of angle iron or steel, (see Fig. 7) and riveted or otherwise secured to arms or brackets $a^{20}$ fastened to the side bars 2, as by rivets or bolts $a^{21}$.

The truck frame has bolted or otherwise secured to it a wooden or other flooring $b$ (see Fig. 1) extending the length of the truck frame, and upon which is erected and firmly secured thereon a cab or house $b'$ of wood or suitable material and of a construction as will be described.

The auxiliary side bars $a^{19}$ $a^{17}$ have bolted or otherwise firmly secured to them side extensions $b^2$ $b^3$ of the flooring $b$, constituting side platforms (see Figs. 1 and 6) which, as herein shown, are provided with railings or guards $b^4$ $b^5$.

Figure 1:
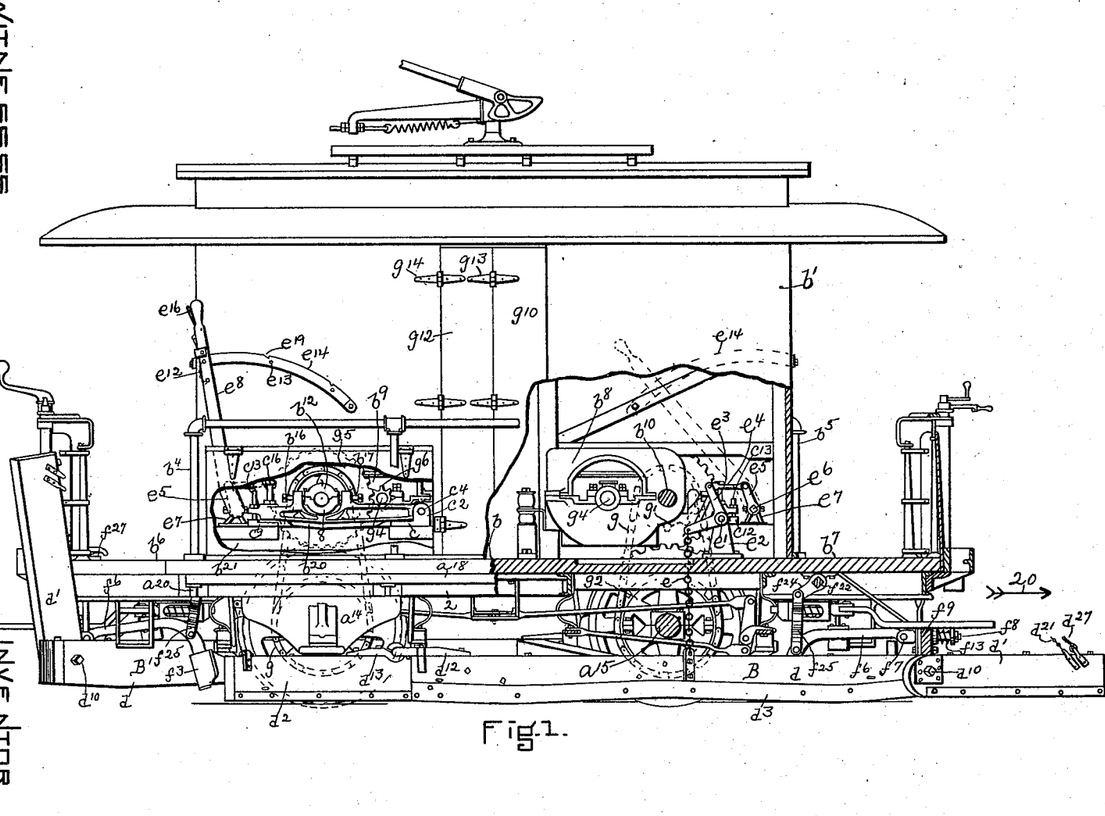
Figure 1 is a side elevation partially in section of an electric snow plow embodying this invention.
Figure 6:
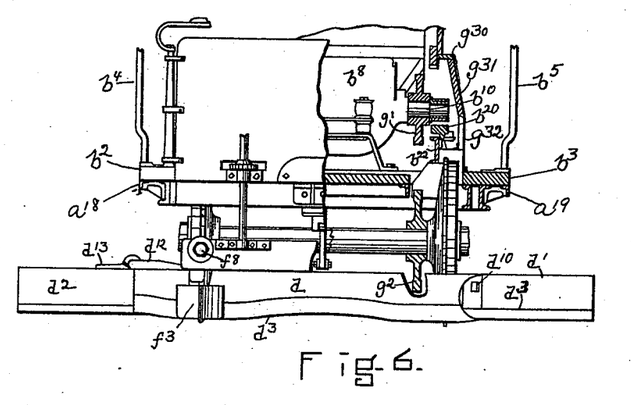
Fig. 6, a detail in front elevation partially broken out of the plow shown in Fig. 1.

The house or cab $b'$ is preferably made shorter and narrower than the truck frame as clearly shown in Figs. 1 and 6, to leave front and rear platforms $b^6$ $b^7$ and the side platforms $b^3$ $b^4$.

In the present instance, I have represented the snow plow as provided with two electric motors $b^8$, $b^9$, only one $b^8$ of which is plainly shown in Fig. 1, and as the manner of supporting the motors and of connecting them to the car axles $a^{15}$ $a^{16}$ is preferably the same, I will specifically describe but one in detail. The motor $b^8$ is mounted at one end on a counter shaft $b^{10}$, preferably arranged for the best results in a substantially vertical line with the axle $a^{15}$, and having bearings in boxes $b^{12}$ adjustably supported in adjustable supports, preferably of a construction as will be described.

Figure 2:
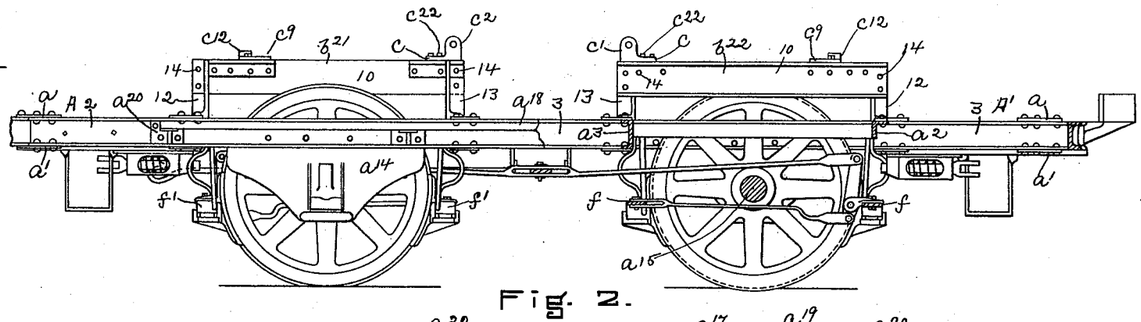
Fig. 2, a side elevation and section of the truck frame on a larger scale, the section being taken on the irregular line 2—2, Fig. 3.
Figure 7:
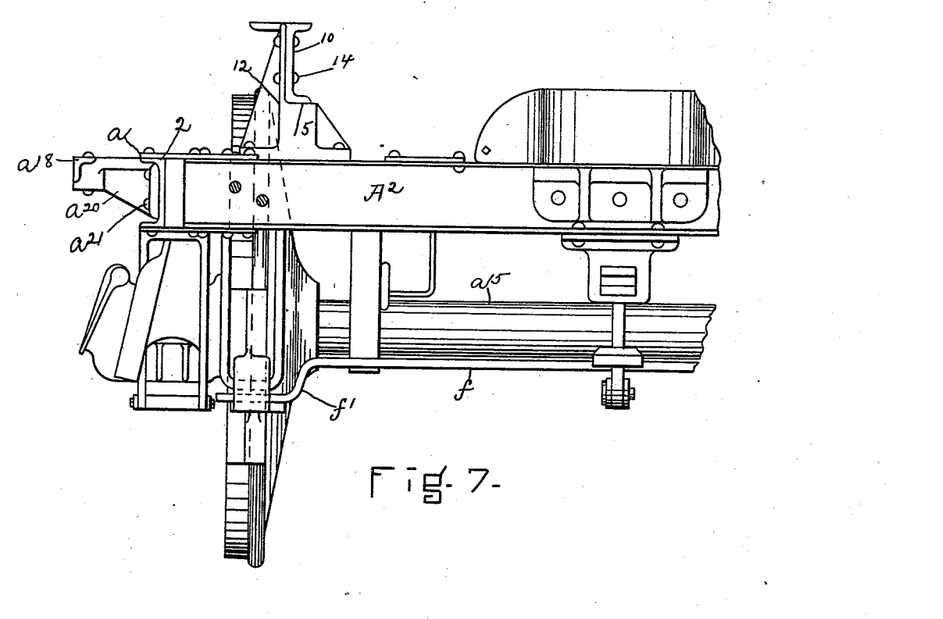
Fig. 7, a detail on an enlarged scale to more clearly show the brake beam.
Figure 13:
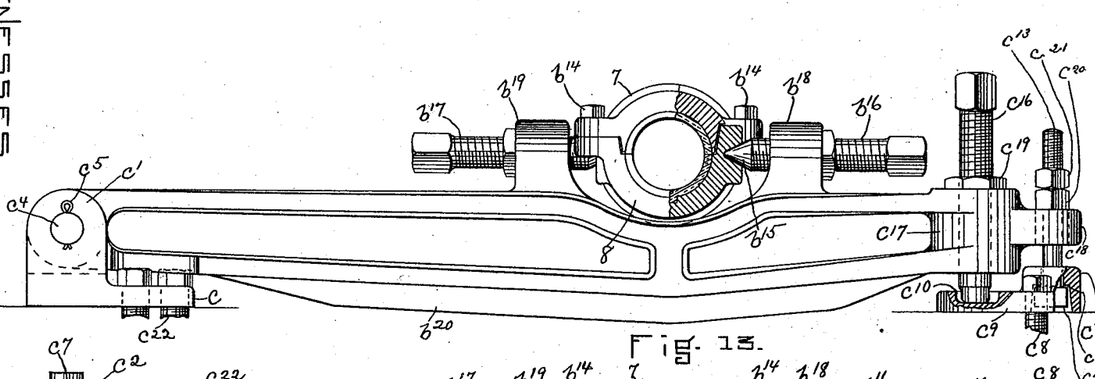
Fig. 13, a detail in side elevation and section on an enlarged scale of the motor support preferred by me, and Fig. 14, a top or plan view of the support shown in Fig. 13 together with the bearing box for the counter shaft as will be described.
Figure 14:
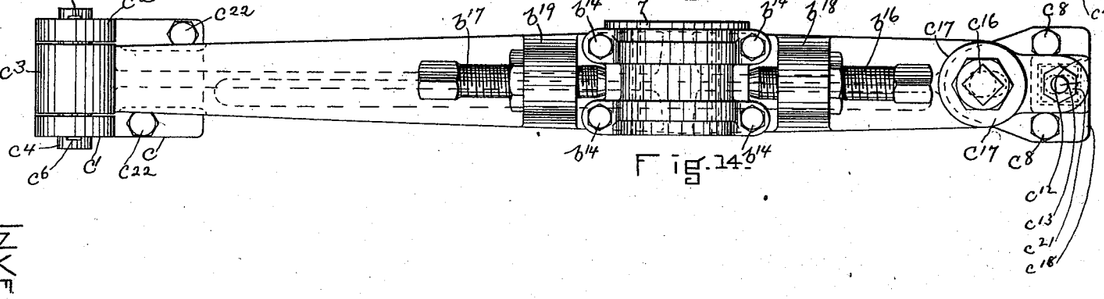

The bearing boxes $b^{12}$ are preferably made as shown in Figs. 13 and 14, each box consisting of two halves 7, 8, secured together by bolts or screws $b^{14}$ and provided on its sides with sockets $b^{15}$, substantially diametrically opposite and preferably conical in form, to receive the pointed or cone-shaped ends of adjusting screws or threaded bolts $b^{16}$, $b^{17}$, extended through threaded openings in upright lugs or ears $b^{18}$, $b^{19}$, secured to or forming part of an adjustable supporting frame or cradle $b^{20}$ preferably made as shown in Figs. 13 and 14. The counter shaft $b^{10}$ is supported at each end in a cradle $b^{20}$ and the said cradles are supported above the truck frame upon metal frames $b^{21}$ $b^{22}$ (see Fig. 3) erected upon the transverse bars $a^2$ $a^3$, and $a^4$ $a^5$, of the truck frame. The metal frames $b^{21}$ $b^{22}$ may and preferably will be made as shown in Figs. 2 and 7, each consisting of a channel bar 10, extended in the direction of the length of the truck and secured at its ends as by rivets 14 to metal standards or uprights 12, 13, the said standards being riveted or otherwise secured to the cross bars of the truck frame. The standards or uprights 12, 13, are preferably made as shown in Fig. 7, each being provided with a shoulder 15 upon which rests the under side of the bar 10, to relieve the rivets 14 from strain, when the motor is mounted on the counter shaft. The channel bar 10 of each frame $b^{21}$ $b^{22}$ near one end has bolted or otherwise secured to it a plate $c$ provided with two lugs $c'$ $c^2$ between which is hung one end of the cradle or supporting frame $b^{20}$, the latter being provided, as herein shown, with a boss $c^3$, having a hole or opening to register with suitable holes or openings in the lugs $c'$ $c^2$, and through which holes is extended a pivot pin $c^4$, preferably removably secured in place by suitable keys or pins $c^5$ (see Fig. 13) inserted through suitable holes or slots $c^6$ $c^7$ in the opposite ends of the pivot pin, as shown in Fig. 14. The channel iron 10 toward its opposite end has secured to it, as by bolts $c^8$, a bearing plate $c^9$ preferably made as herein shown, it being provided at one end on its upper face with a socket or cavity $c^{10}$ and at its other end with a raised portion or head $c^{12}$ having an opening through which is loosely extended a bolt $c^{13}$, the said bolt having a head $c^{14}$ located beneath the raised portion $c^{12}$ of the bearing plate and between it and the channel bar 10, the said head being adapted to engage a shoulder $c^{15}$ of the raised portion $c^{12}$ to limit the upward movement of the bolt $c^{13}$. The socket or cavity $c^{10}$ is designed to receive the end of an adjusting bolt $c^{16}$ extended through a threaded opening in an enlargement $c^{17}$ of the cradle, and provided with a checknut $c^{19}$, and the threaded bolt $c^{13}$ is also extended through an opening in a projection or lug $c^{18}$ at the end of the said cradle, and is provided at its upper end above the said lug or projection with a checknut $c^{20}$ and locknut $c^{21}$.

The cradle $b^{20}$ may be turned on its pivot $c^4$ by means of the adjusting bolt $c^{16}$, and may be held in its adjusted position by means of the nuts $c^{20}$ $c^{21}$ on the rod $c^{13}$. The plate $c$ may be secured to the channel bar 10 of its supporting frame by bolts $c^{22}$.

Figure 4:
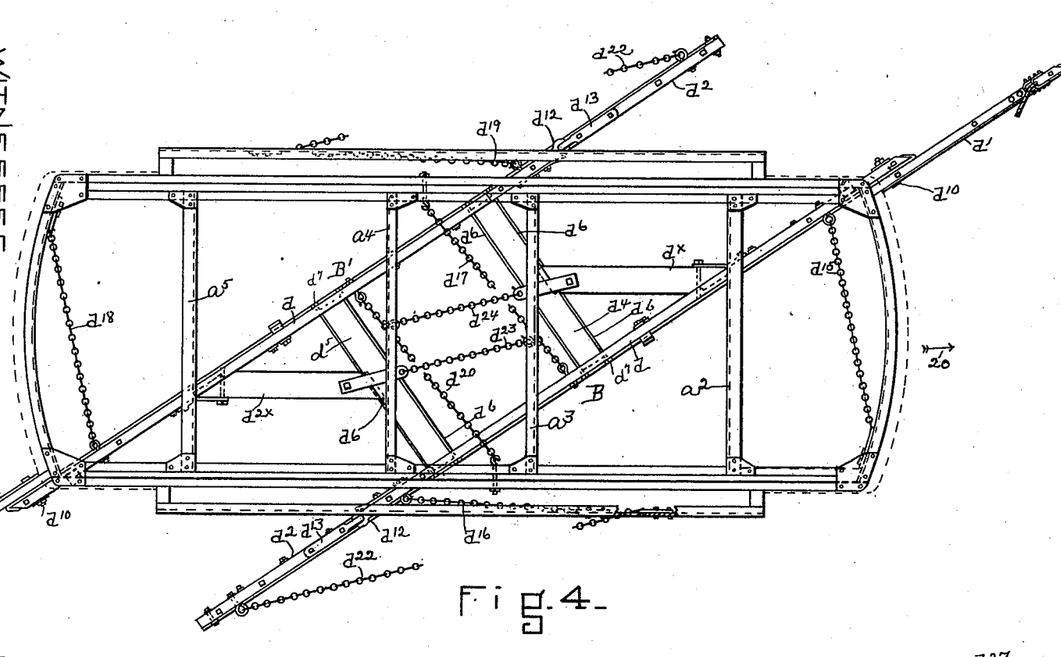
Fig. 4, a detail in plan view to more clearly show the shears.
Figure 5:
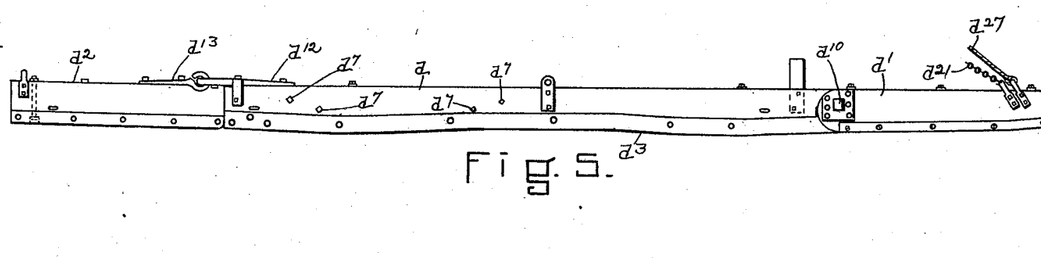
Fig. 5, a detail in side elevation of the shears shown in Fig. 4.

The truck frame has located below it preferably two sets of scrapers or shears B B' shown best in Fig. 4, and for the best results, each scraper or shear is preferably composed, as herein shown, of three sections or members $d$ $d'$ $d^2$, which may be made of wood or other suitable material, and each provided with a metallic strip $d^3$ constituting a cutting or shearing edge. The members or sections $d$ of the shears B B' are preferably strengthened by cross braces or timbers $d^4$ $d^5$ and rods $d^6$ extended through the members $d$ and secured thereto by nuts $d^7$ (see Fig. 5) or in other suitable manner, and preferably also by braces $d^\times$ $d^{2\times}$, the brace $d^\times$ being secured to the member $d$ of the shear B and cross brace $d^4$, and the brace $d^{2x}$ to the member $d$ of the shear B' and to the cross brace $d^5$. The shears B B' are preferably extended substantially diagonally across the truck frame, so that the members or sections $d'$ of the said shears project in front of the truck frame substantially at two diagonally opposite corners as represented in Fig. 4, while the members $d^2$ extend rearwardly in an oblique direction from substantially the longitudinal center or beyond the longitudinal center of the truck frame, and while I prefer substantially the location and arrangement of the shears shown, I do not desire to limit my invention in this respect. The members $d'$ $d^2$ of each shear are preferably pivotally connected to the member $d$, and as herein shown, the member $d'$ is pivotally connected by means of a bolt $d^{10}$ extended through the sides of the members $d$ $d'$, while the member $d^2$ is pivotally connected, as herein shown, by interlocking plates, straps or bars $d^{12}$ $d^{13}$ bolted or otherwise secured to the upper side of the members $d$ $d^2$ as clearly shown in Fig. 5.

The shears B B' are firmly, but movably secured to the truck frame, and as herein represented, the said shears are secured by flexible connections shown as chains, the member $d$ of the shear B being secured by chains $d^{15}$ $d^{16}$ to the truck frame in front of it and by the chain $d^{17}$ to the truck frame in the rear of it, as clearly shown in Fig. 4, while the member $d$ of the shear B' is connected in a similar manner by the chains $d^{18}$, $d^{19}$, $d^{20}$. The members or sections $d'$ $d^2$ of each shear are connected by the chains $d^{21}$ $d^{22}$ to the truck frame. The intermediate braces are also preferably secured by chains $d^{23}$ $d^{24}$ to the cross bars $a^3$ $a^4$.

Figure 11:
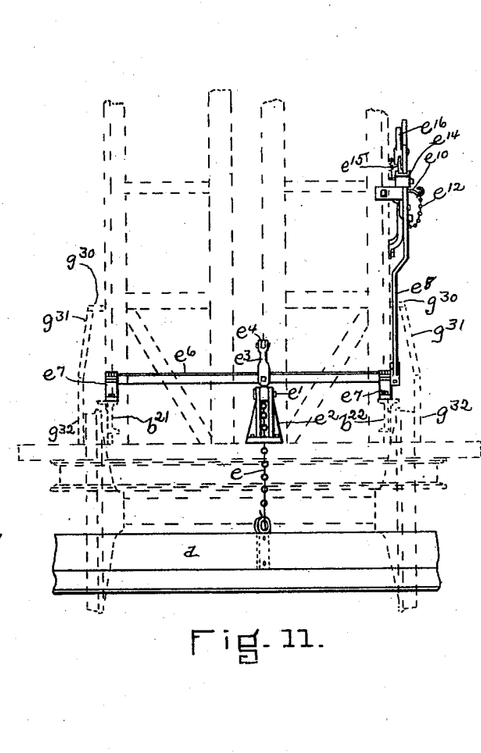
Fig. 11, a detail in end elevation to more clearly show the shear operating mechanism.
Figure 12:
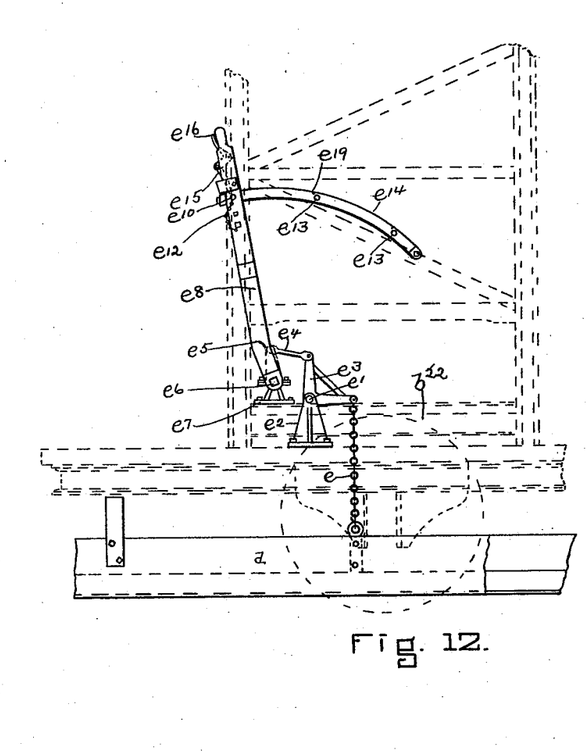
Fig. 12, a detail in side elevation of the parts shown in Fig. 11.

The shears B B' are constructed and connected to the truck frame so as to overcome a substantially great resistance such as might be offered by a substantially large amount of snow. The pivoted members or sections $d'$ $d^2$ are adapted to be lifted into a substantially vertical position when not in use or when it it is desired to clear an obstacle, and this may be accomplished by ropes $d^{27}$ suitably connected to said members and accessible from the platforms of the snow plow, only a portion of one rope being represented in Fig. 5. In practice, only one shear at a time is required to be used, for instance, when the snow plow is traveling in the direction indicated by arrow 20, Figs. 1 and 4, the shear B will be in operation, while the shear B', if desired, may be lifted above the road bed and rendered inoperative. So also, both shears may be lifted above the road bed when not in use or for other purpose, and this result may be accomplished by a mechanism as will now be described. The member $d$ of each shear is secured preferably by a flexible connection $e$, such as a chain or rope, to one arm of a bell crank lever, (see Figs. 1, 11, and 12) pivotally mounted, as at $e'$, in a suitable standard or upright $e^2$ bolted or otherwise fastened to the floor $b$ within the cab or house $b'$, and substantially near the center of the same, the said lever having its other arm $e^3$ joined by a link or rod $e^4$ to a crank or arm $e^5$ fast on a rock shaft $e^6$ and located substantially near the longitudinal center of the said shaft, the latter having bearings in suitable uprights $e^7$ bolted or otherwise secured to the cradle supporting frames $b^{21}$ $b^{22}$. The rock shaft $e^6$ is extended beyond the cab or house $b'$, and has fast on it a lever or arm $e^8$ adapted to be turned in the arc of a circle and to be held or locked at any desired portion of its movement, to regulate the distance the shear is lifted above the road bed. In the present instance, I have shown a pin $e^{10}$ (see Figs. 1 and 12) as attached to the lever or arm $e^8$ by a chain $e^{12}$ and adapted to be inserted through a hole in the said lever and into one of a number of holes $e^{13}$ in a plate or bar $e^{14}$ attached to the outside of the cab or house, and if desired, the lever or arm $e^8$ may be provided with a pawl $e^{15}$ (see Fig. 12) pivoted to a spring actuated lever $e^{16}$ pivoted to the lever or arm $e^8$, the said pawl being adapted to engage teeth or notches $e^{19}$ in the plate or bar $e^{14}$. When the lever or arm $e^8$ is in the position shown by full lines, Fig. 1, and in Fig. 12, the member $d$ of the shear actuated by the said lever, is raised or lifted into its highest position with relation to the road bed, and by unlocking the said lever or arm and turning it toward the right (viewing Figs. 1 and 12) or into substantially the position indicated by dotted lines Fig. 1, the member $d$ of the said shear is lowered into its operative position.

Figure 8:
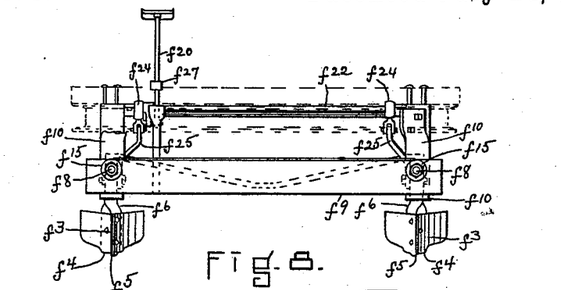
Fig. 8, a detail in front elevation to more clearly show the "diggers.
Figure 9:
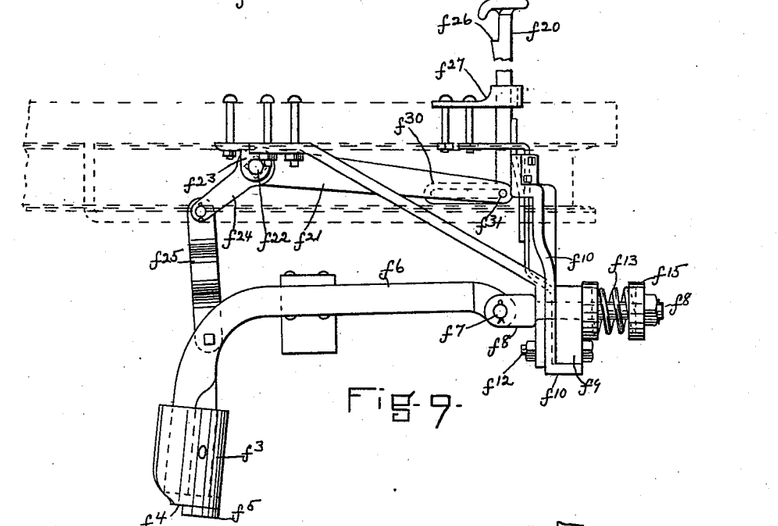
" Fig. 9, a side elevation of the parts shown in Fig. 8.
Figure 10:
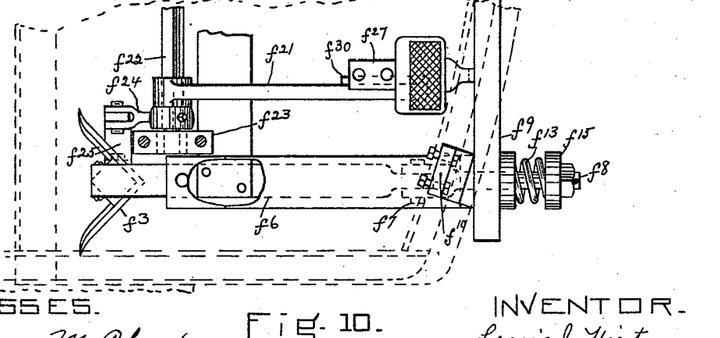
Fig. 10, a detail in plan of the parts shown in Figs. 8 and 9.

The truck frame is provided with the usual brake-operating mechanism shown in Figs. 2 and 3, and in order to permit the shears B B' to be made of substantial height and yet afford room for the shears to be lifted or raised, as above described, the brake beams $f$ of the truck are offset or bent upward, at their opposite ends as at $f'$ (see Fig. 7) so that the main portion of the brake beam is out of the way of the shears when the latter are lifted. The snow plow is preferably provided at each end with a device for cleaning the rails of the track, and for the best results, I prefer to provide each end of the snow plow with two such devices, or as I prefer to call them "diggers" which are adapted to be operated from the platform by the motorman. Each "digger" referred to, may and preferably will be made as shown in Figs. 8 to 10 inclusive, and consists of a substantially wedge-shaped structure $f^3$ shaped at its lower end to conform to the shape of the rail, so that one surface, as $f^4$, may engage with the top of the rail, and another surface, as $f^5$, may engage with the inner-side of the rail, so that, that portion of the rail with which the rim and flange of the wheel engage, may be freed from ice or snow, thereby insuring good electrical contact between the car wheels and rail. The "digger" $f^3$ as herein shown is secured to or forms part of a curved or bent lever $f^6$ pivotally connected, as at $f^7$, to a sliding bar or rod $f^8$ extended through a support herein represented as the usual guard bar $f^9$ secured to hangers $f^{10}$, as by bolts $f^{12}$, the said rod being encircled for a portion of its length by a spiral spring $f^{13}$ and acting against a collar or head $f^{15}$ on the said rod to normally keep the rod $f^8$ projected forward, and which permits the said rod to be moved backward and upward by the "digger" meeting an obstruction on the track, thereby preventing injury to the said "digger."

The "digger" may be raised and lowered from the platform of the snow plow, as herein shown, by means of a foot rod $f^{20}$ extended through the platform of the plow and operatively connected to one end of a crank or arm $f^{21}$ secured to a rock shaft $f^{22}$ having bearings in suitable hangers $f^{23}$ attached to the under side of the platform, the said shaft having secured to it a crank or arm $f^{24}$ joined by a link $f^{25}$ to the "digger" lever $f^6$. In the present instance, the foot rod $f^{20}$ is provided with an arm $f^{30}$ (see Fig. 9) having a slot into which projects a pin, stud, or roller $f^{31}$ on the crank arm $f^{21}$, whereby the latter may be moved in the arc of a circle while the foot rod $f^{20}$ moves in a substantially straight line.

The "digger" may and preferably will be normally held above the rail, and this may be effected as herein shown by providing the foot rod $f^{20}$ with a locking projection $f^{26}$ adapted to engage a lip on a guide plate $f^{27}$ secured to the top of the platform and through a slot or opening in which the foot rod is extended.

The "digger" may be released from its elevated position by the operator disengaging the locking projection $f^{26}$ from the guide plate $f^{27}$, and when released the "digger" is free to descend by gravity or it may be assisted by a spring or other suitable device, not herein shown.

Each truck axle may be geared to the counter-shaft $b^{10}$, which may be effected, as herein shown, by a sprocket chain $g$, (see Fig. 1) passed about sprocket wheels $g'$ $g^2$ fast on the shaft $b^{10}$ and the truck axle respectively, as shown in said figure, and the shaft $b^{10}$ may be geared to the armature shaft $g^4$ of the motor by a gear $g^5$ on the shaft $b^{10}$ in mesh with a pinion $g^6$ on the armature shaft, as shown at the left in Fig. 1. The sprocket chain $g$ and the chain $e$ pass through a suitable slot or slots in the floor of the cab or house and by means of the adjustable cradles any slack in the sprocket chains may be taken up. To permit of the entrance into the cab or house from the side platforms, preferably both sides of the said house are provided with doorways normally closed by doors which are composed of two sections or parts $g^{10}$, $g^{12}$ secured together by hinges $g^{13}$, and the part $g^{12}$ is further attached to the house or cab by hinges $g^{14}$. By this construction, the section $g^{10}$ may be folded back against the section $g^{12}$ and both sections folded at substantially right angles to the side of the cab, thereby opening wide the door, within the narrow distance or space between the side of the cab and the guard rails on the side platforms, a single folding door being rendered impractical on account of the narrow side platform and its guard rail, and a sliding door being also impractical in the present construction, on account of the supporting frames $b^{21}$ $b^{22}$.

In order to permit the supporting frames $b^{21}$ $b^{22}$ to be set as wide apart as possible, consistent with the rest of the construction, the sides of the house or cab are cut away or omitted at their lower portion substantially in front of the motors, preferably on both sides, and are provided with an outwardly projecting wall or ledge $g^{30}$ (see dotted lines Fig. 11) to which are hung substantially beveled or inclined lids or covers $g^{31}$, which cooperate with a lower wall $g^{32}$ practically forming part of the side of the cab, as if the lower portion of the side of the cab had been moved outward bodily. This construction permits of access to the motors from outside the cab, and the cover or lid $g^{31}$ is made of such size as will permit it to be readily turned upward in the space between the cab and the guard rail of the side platform.

The adjustable cradles or motor supporting frames and the particular construction of the cab or house by which access to the said supporting frames may be had from outside the said cab or house, are not herein claimed, as these features form the subject matter of another application, Serial No. 516,117, filed by me June 29, 1894.

I claim—

1. The combination with an electrically propelled snow plow, of a metallic truck frame consisting of metallic side bars each comprising two bars and end bars and intermediate cross bars firmly secured together, substantially as described.

2. The combination with an electrically propelled snow plow, of a metallic truck frame consisting of metallic side and end bars, intermediate cross bars firmly secured to the said side bars, and longitudinal bars secured to the said cross bars, within or between the side bars of the truck frame substantially as described.

3. The combination with an electrically propelled snow plow, of a metallic truck frame consisting of metallic side and end bars, and auxiliary side bars firmly secured to the outside bars of the truck frame, and of less length than the truck frame substantially as described.

4. The combination with an electrically propelled snow plow, of a metallic truck frame consisting of metallic side and end bars, intermediate cross bars firmly secured to the said side bars, in pairs and supporting frames erected upon each pair of the said cross bars within the said bars of the truck frame and extended in the direction of the length of the truck frame, above the car axles of the truck substantially as described.

5. The combination with an electrically propelled snow plow, of a metallic truck frame comprising metallic side bars and cross bars arranged in pairs, housings for car axles located between the pairs of cross bars, supporting frames erected upon the said cross bars above the truck frame and extended in the direction of the length of the said truck frame, above the said car axles substantially as described.

6. In an electrically propelled snow plow, the combination of the following instrumentalities, viz:—a metallic truck frame comprising side and end bars mounted on axles having wheels and auxiliary side bars secured to the sides of the truck, a flooring secured to the truck frame and having side extensions secured to the top of the auxiliary side bars, and a cab or house supported on the flooring to leave front and rear platforms and side platforms, substantially as described.

7. In an electrically propelled snow plow, a metallic truck frame mounted on axles having wheels and consisting of sides A A' and ends $A^2 A^3$, auxiliary side bars firmly secured to the sides A A' and of less length than the said sides a flooring secured to the top of the said truck frame, side extensions of the said flooring supported by the said auxiliary side bars a cab or house of less area than the truck and supported on said flooring to leave side and end platforms, a rock shaft having bearings in supports located within the said cab or house, and a flexible connection joining said rock shaft to a shear located beneath the truck frame, and means to operate said rock shaft, substantially as described.

8. In an electrically propelled snow plow, a metallic truck frame mounted on two axles having wheels, a flooring firmly secured to said truck frame, a cab or house supported on said flooring, metal frames extended in the direction of the length of the truck, a rock shaft located within the said cab or house and supported on said metal frames, means to flexibly connect the said rock shaft to a shear located below the truck frame, and means to operate said rock shaft from outside the said cab or house, substantially as described.

9. In an electrically propelled snow plow, a metallic truck frame provided with end platforms and with side platforms having a guard rail, a flooring firmly secured on top of the said frame a cab or house mounted on the truck and provided with a double folding door, substantially as and for the purpose specified.

10. In an electrically propelled snow plow, the combination of the following instrumentalities, a truck frame mounted on axles having wheels, a shear located below the said truck frame and capable of vertical movement toward and from the truck frame, and a brake beam secured to the said truck frame and offset upward to permit the said shear to be made of substantial height, substantially as described.

11. In an electrically propelled snow plow, a metallic truck frame mounted on axles having wheels, a digger to act on the rail of the track, a lever to which said digger is attached, a sliding bar or rod to which the said digger is pivotally connected, a support for said sliding bar rigidly secured to the truck, and a buffer or yielding medium to act on the said sliding bar, substantially as described.

12. An electrically propelled snow plow provided with a guard bar located below the car platform in front of the car wheels, a "digger" to act on the rail of the track, a lever to which said "digger" is attached, a sliding bar or rod carried by the guard bar and to which the said "digger" lever is pivotally connected, and a buffer or yielding medium to act on said sliding bar, substantially as described.

13. An electrically propelled snow plow provided with a guard bar located below the car platform in front of the car wheels, a "digger" to act on the rail of the track, a lever to which said "digger" is attached, a sliding rod carried by the guard bar and to which the said "digger" lever is pivotally connected, a spring encircling said sliding bar, a rock shaft to which said "digger" lever is connected, and means to operate said rock shaft from above the platform of the car, substantially as described.

14. In an electrically propelled snow plow, the combination of the following instrumentalities, a metallic truck frame mounted at its opposite ends on axles having wheels, shears B B', each comprising a member $d$ extended diagonally across the plow and members $d'$ $d^2$ pivotally connected to the member $d$, cross braces connecting the members $d$ of the shears B B', braces connecting the said cross braces to the members $d$ of the said shears, and flexible connections joining the member $d$ of each shear to the opposite sides of the metallic truck frame, substantially as described.

15. In an electrically propelled snow plow, a metallic truck frame having sides composed of two channel bars and ends composed of channel bars, and gusset plates to which the said side and end bars are secured, substantially as described.

In testimony whereof I have signed my name to this specification in the presence of two subscribing witnesses.

LOUIS J. HIRT.

Witnesses:
JAS. H. CHURCHILL,
J. MURPHY.